United States Patent

Couture et al.

Patent Number: 5,807,484
Date of Patent: Sep. 15, 1998

[54] WASTE WATER TREATMENT

[76] Inventors: Real Couture, 2426 Du Buran, Varennes, Quebec, Canada, J3X 1L2; Denis Tremblay, 41 St. Andre, St. Luc, Quebec, Canada, J2W 1T5

[21] Appl. No.: 735,886

[22] Filed: Oct. 23, 1996

[51] Int. Cl.⁶ .................................. C02F 3/04; C02F 3/30
[52] U.S. Cl. .................. 210/605; 210/615; 210/621; 210/624; 210/631; 210/903; 210/906
[58] Field of Search .............. 210/605, 615–617, 210/630, 903, 906, 603, 604, 620, 631, 621, 622, 624

[56] References Cited

U.S. PATENT DOCUMENTS

| | | | |
|---|---|---|---|
| 4,867,883 | 9/1989 | Daigger et al. | 210/605 |
| 5,342,522 | 8/1994 | Marsman et al. | 210/605 |
| 5,520,812 | 5/1996 | Ryhiner et al. | 210/903 |
| 5,582,732 | 12/1996 | Mao et al. | 210/617 |
| 5,605,629 | 2/1997 | Rogalla | 210/605 |

*Primary Examiner*—Thomas G. Wyse
*Attorney, Agent, or Firm*—Eric Fincham

[57] ABSTRACT

A method for treating waste water which comprises passing the water through a series of steps including sequentially passing the water through an aeration step, and then a plurality of treatment cells wherein each treatment cell comprises a trickle filter cell. The waste water is subsequently subjected to a denitrification step and to a dephosphorization step. It is then passed through a trickle filter cell and optionally may be treated by passing through a cell wherein the waste water is in contact with peat moss.

12 Claims, 1 Drawing Sheet

WASTE WATER TREATMENT

FIELD OF THE INVENTION

The present invention relates to waste water treatment and particularly the treatment of sewage.

BACKGROUND OF THE INVENTION

The treatment of waste water is, by necessity, practiced in most urban areas. As such, there is a large body of literature proposing many different methods and systems for treating the wastewater. The method include mechanical operations, chemical treatment of the waste water and biological treatment as well as various combinations thereof. The treatments are generally classified as either being primary, secondary or tertiary.

Widely practiced by many systems are a plurality of steps which may include rough filtering, decreasing, decantations and biological treatment by aeration.

One of the problems associated with the treatment of urban waste water has been the cost of plant installations. Generally the installations have tended to be large in size and frequently have to be located in more remote areas due to odor problems.

BRIEF SUMMARY OF THE INVENTION

It is an object of the present invention to provide a waste water treatment method and apparatus which is economical to build for different treatment capacities.

It is a further object of the present invention to provide a relatively simple waste water treatment method and apparatus, which apparatus is simple to operate, occupies little terrain, and is energy efficient.

It is a further object of the present invention to provide a waste water treatment apparatus and method wherein the waste water is subjected to a plurality of treatment steps and wherein control is maintained during all treatments.

According to one aspect of the present invention, there is provided a method for treating waste water and which method includes the steps of subjecting the waste water to an aeration and subsequently passing the waste water through a plurality of treatment cells. Each of the treatment cells comprises a trickle filter cell whereby the waste water is subjected to the action of bacteria on media in the trickle filter cell. Following the treatment by the trickle filter cells, the waste water is then subjected to a denitrification step followed by a dephosphorization treatment. The waste water is then passed through a further trickle filter cell.

In a further aspect of the present invention, there is provided a waste water treatment system which comprises an aeration station, a treatment station comprising a plurality of treatment cells, a denitrification station, a dephosphorization station, and a further treatment cell, each of the treatment cells having a plurality of media therein, and means for transferring fluid from said aeration station through the plurality of treatment cells, to the denitrification station and subsequently to the dephosphorization station. There are means for passing the waste water to the further treatment cell.

A first pretreatment step in the practice of the present invention may utilize a decantation operation by means of a holding tank similar to the well known septic tank. The septic tank can be formed of any suitable material such as concrete; the septic tank is preferably sized so as to be able to contain a sufficient volume at least equivalent to 36 hours of effluent flow. As is the case in most septic tanks, the tank may include a mid wall to divide the tank into first and second sections.

Normally, the septic tank will be supplied with the material to be treated from a pumping station (central septic tank) or one could utilize a plurality of site based tanks from where effluent output would flow to the system. The tank may include a liquid inlet, a liquid outlet, and a gas outlet.

After passing through what is essentially a decantation operation in the septic tank, the waste water is directed to an aeration station which may conveniently comprise a tank or basin. The aeration tank preferably has first and second liquid inlets (for reasons which will be discussed hereinbelow), a liquid outlet, and also an outlet for permitting the egress of gases (as will also be discussed hereinbelow).

At the aeration station, the primary goal is to increase the concentration of dissolved oxygen in the water and also to maintain the suspended solids in suspension. For this reason, the aeration tank is preferably equipped with submersed aerators.

Conveniently, this tank may also be formed of a concrete material and would include means for pumping the aerated liquid to the main treatment station of the present invention.

The treatment station will include means for subjecting the waste water to a plurality of so called trickle filter cells. The function of the trickle filter cells is to provide a favourable milieu for the development of bacteria. Accordingly, it is necessary to supply sufficient air or oxygen or carbonaceous sources along with a support and a suitable temperature for bacterial development.

Each of the treatment sections or cells includes a plurality of media placed within the treatment section. The waste water is pumped to a diverter at the top of the section following which the water will pass over the media before returning to the base of the section. At the base, there is provided a basin and a recirculation pump so that the waste water may be recirculated on a continual basis.

Each of the treatment cells preferably includes a plurality of media therein of the type disclosed in copending application Ser. No. 08/735,888, filed Oct. 23. 1996 as now U.S. Pat. No. 5,779,886, entitled "Media for Filtration", Inventor: Real Couture, the disclosure of which is hereby incorporated by reference. These cells which are commonly known as trickle filter cells subject the waste water to a bacterial action. The water is pumped to a diverter which is situated at the top of the cell and then is allowed to trickle downwardly over the media whereon there is a layer of bacteria before the water returns to the basin at the bottom of the cell wherein it can be recirculated.

The number of treatment cells may vary although it has been found that for typical urban waste, the use of three such trickle filter cells gives good results.

The waste water is allowed to flow through three of the trickle filter cells and then, before going to the fourth trickle cell, is subjected to a denitrification and dephosphorization treatment.

Thus, the waste water is permitted to flow, from the third trickle filter cell, to a basin wherein denitrification occurs. Bacteria of the type Nitrobacter and Nitrosomonas transform the nitrates and nitrites into a gaseous nitrogen. Both the liquid and solids are pumped (separately) to an anaerobic treatment basis for dephosphorization.

The dephosphorization basin favours the maintenance of conditions required for the fixation of phosphates by the bacteria.

Following the dephosphorization treatment, the liquid is transferred to a fourth trickle filter cell wherein the process of dephosphorization is continued. Thus, the anaerobic basin generates and conditions the dephosphorization bacteria and in the fourth trickle filter cell the dephosphorization is accelerated.

In a preferred embodiment of the invention, there may be provided a fifth trickle filter cell, which cell is filled with a peat moss material. This final polishing of the waste water by the moss assists in reducing chloroform count, and the BOD. Also, this polishing is useful to remove any remaining suspended solids.

As a final treatment, the water may then be subjected to a UV treatment or an ozination treatment.

Conveniently, the treatment station may be fabricated from interlocking concrete blocks without the use of mortar. This would facilitate a rapid and relatively inexpensive construction. To seal the interior surface of the stations, a membrane of a suitable plastic material such as PVC may be utilized. The outside walls may conveniently have a suitable insulating material applied thereto.

Even in relatively cold climates, there is generally enough heat generated to maintain an adequate temperature for the growth of bacteria. If desired in certain temperature extremes, provision for some additional heating input could be incorporated.

The apparatus can include means for monitoring to determine the concentration of different contaminants present in the water being treated and to adjust the treatment as a function of these parameters. One could install measuring devices at different places for determining the dissolved oxygen, suspended solids, phosphorus, ammonia, and of the COD which is an indicator of the biochemical demand of oxygen.

These measurements can be computerized to analyze the parameters and thereby to control the speed of recirculation of the treated water in the treatment section and to open or close vanes associated with the recirculation pumps. This information could indeed be remotely monitored and the system controlled from the remote location.

Having thus generally described the invention, reference will be made to the accompanying drawings illustrating an embodiment thereof, in which:

DETAILED DESCRIPTION OF THE EMBODIMENTS

Figure 1:
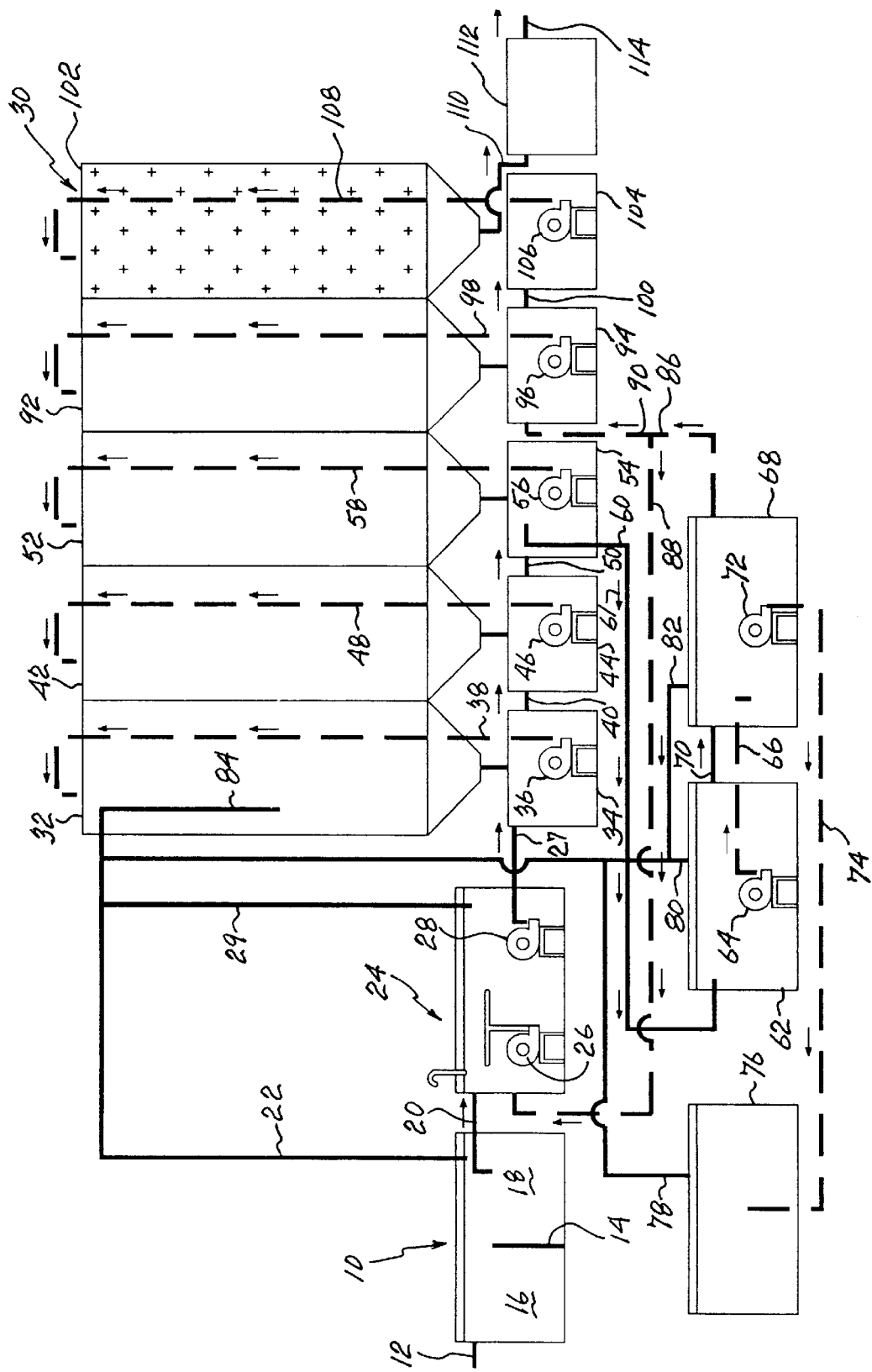
FIG. 1 is a side elevational view, in schematic form, of a waste water treatment system according to the present invention.

Referring to the drawing in greater detail and by reference characters thereto, the illustrated system includes a first sedimentation or decantation tank generally designated by reference numeral 10. Basin 10 includes a waste water inlet 12 and an interior dividing wall 14 separating the basin into first and second sessions 16 and 18 respectively. From second section 18, an overflow conduit 20 permits passage of fluid to an aeration basin which is generally designated by reference numeral 24. A gas outlet conduit 22 extends from the upper portion of basin 10 for reasons which will be discussed hereinbelow.

At aerator basin 24, there is provided a basin having a submersed aerator 26 in order to provide maximum oxygenation to the waste water and to help maintain the suspended solids in suspension.

A pump 28 pumps the waste water through a fluid outlet conduit 27. A gas outlet conduit 29 is also provided from the upper portion of basin 24.

The invention utilizes a treatment station which is generally designated by reference numeral 30. Treatment station 30 includes a first cell 32 having a basin 34 therebelow. Mounted within basin 34 is a pump 36 to pump the waste water received from conduit 37 up through conduit 38 to the top of cell 32. Mounted within cell 32 are media (not shown) to provide for the growth of bacteria as the waste water trickles down therethrough (a trickle filter). Basin 34 includes an overflow conduit 40.

Overflow conduit 40 communicates with a second basin 44 of a second cell 41. In a manner similar to that of first cell 32, there is provided a pump 46 in a basin 44 to pump the waste water fluid to the top of cell 42. Again, cell 42 is a trickle filter having a plurality of media therein.

An overflow conduit 50 is in fluid communication with a third basin 54 forming a part of a third cell 52. As was the case with the first two cells, there is provided a pump 56 to pump the waste water up conduit 58 to the top of third cell 52. Third cell 52 also contains a media as has previously been described.

From basin 54 of third cell 52, there is provided an overflow conduit 60 which is preferably gravity fed and wherein the wastewater flows in the direction as indicated by arrow 61 to a denitrification basin 62. Within basin 62 there is provided a pump 64 which is adapted to pump solids therefrom from a conduit 66 to an anaerobic dephosphorization treatment basin generally designated by reference numeral 68. Water flows by gravity from overflow conduit 70 between basins 62 and 68.

Basins 62 and 68 are sized to have a capacity roughly equivalent to 1½ hours of fluid treatment. A pump 72 in basin 68 is adapted to pump solids or the sludge to conduit 74 to a solids storage container 76.

It will be noted that container 76 has a gas outlet 78 associated therewith. In a similar manner, there are provided gas outlets 80 and 82 associated with basins 62 and 68 respectively. Gas outlets 22, 29, 78, 80 and 82 are adapted to feed gases emanating from their respective basins or containers to a gas inlet conduit 84 associated with first cell 32. By so doing, gases from these containers are released therein and tend to be dissolved within the action of first cell 32.

From anaerobic basin 68, fluid is pumped by means of a pump (not shown) through a conduit 86. In turn, a portion, (preferably in the area of 10%–25%) of the liquid from conduit 26 is fed through a conduit 88 which is in fluid communication with aerator basin 24. The remaining portion (approximately 75%–90%) is fed through conduit 90 to a basin 94 associated with a fourth cell 92. Fourth cell 92 is a trickle filter also contains a plurality of media; liquid is pumped from cell 94 by means of pump 96 through a conduit 98 to the top of the cell.

An overflow conduit 100, in the illustrated embodiment, is in fluid communication with a basin 104 of a fifth cell 102. Fifth cell 102 is preferably filled with a peat moss. As shown, a pump 106 pumps fluid through conduit 108 to the top portion of cell 102 from where the waste water may filter therethrough.

At the bottom of cell 102, there is provided a discharge conduit 110 in fluid communication with a final treatment station 112. Station 112 is a UV treatment station; from there, the treated waste water is discharged through conduit 114.

It will be understood that the above described embodiment is for purposes of illustration only and that changes and modifications may be made thereto without departing from the spirit and scope of the invention.

We claim:

1. A method for treating waste water comprising the steps of:
   a) aerating said waste water to increase the oxygen content of the waste water;
   b) passing said waste water from step (a) to a plurality of sequential trickle filter cells;
   c) introducing said waste water from step (b) to a denitrification basin;
   d) introducing said waste water from step (c) to an anaerobic dephosphorization basin;
   e) passing said waste water from step (d) to a trickle filter cell; and
   f) passing said waste water from step (e) through a filter media comprised of peat moss.

2. The method for treating waste water of claim 1 wherein said step of aerating said waste water to increase the oxygen content of the waste water comprises passing said water to an aeration basin having at least one submersed aerator therein to thereby assist in maintaining suspended solids in suspension.

3. The method for treating waste water of claim 1 additionally comprising the step of removing gases from said denitrification basin and said dephosphorization basin and introducing said gases into at least one of said sequential trickle filter cells of step (b).

4. The method of claim 1 further including the step of decanting said waste water prior to aerating said waste water in step (a).

5. The method of claim 2 further including the step of subjecting said waste water from step (f) to a tertiary treatment comprising an ozone or ultraviolet treatment.

6. The method of claim 1 further including the step of transferring sludge from said denitrification basin of step (c) to said dephosphorization basin in step (d).

7. The method of claim 2 further including the step of recycling a portion of said waste water from step (d) to said step (a).

8. A method for treating waste water comprising the steps of:
   a) aerating said waste water to increase the oxygen content of the waster water;
   b) passing said waste water from step (a) to a plurality of sequential trickle filter cells;
   c) introducing said waste water from step (b) to a denitrification basin;
   d) introducing said waste water from step (c) to an anaerobic dephosphorization basin;
   e) passing said waste water from step (d) to a trickle filter cell; and
   f) removing gas from said denitrification basin and from said dephosphorization basin and introducing said gases to at least one of said plurality of sequential trickle filter cells.

9. The method of claim 8 further including the step of decanting said waste water prior to aerating said waste water in step (a).

10. The method of claim 8 further including the step of subjecting said waste water from step (f) to a tertiary treatment comprising an ozone or ultraviolet treatment.

11. The method of claim 8 further including the step of transferring sludge from said denitrification basin of step (c) to said dephosphorization basin in step (d).

12. The method of claim 8 further including the step of recycling a portion of said waste water from step (d) to said step (a).

* * * * *